(12) United States Patent
Baldwin et al.

(10) Patent No.: US 9,747,327 B2
(45) Date of Patent: Aug. 29, 2017

(54) MANAGING CONTENT ITEM SYNDICATION BY MAINTAINING REFERENTIAL INTEGRITY BETWEEN REMOTE OR ISOLATED SYSTEMS

(71) Applicant: International Business Machines Corporation, Armonk, NY (US)

(72) Inventors: Nicholas A. Baldwin, Gladesville (AU); Lee Berry, Ashfield (AU); Asela J. Mallawaaratchy, Hinchinbrook (AU); Eric M. Morentin, Manly (AU)

(73) Assignee: International Business Machines Corporation, Armonk, NY (US)

(*) Notice: Subject to any disclaimer, the term of this patent is extended or adjusted under 35 U.S.C. 154(b) by 126 days.

(21) Appl. No.: 14/494,623

(22) Filed: Sep. 24, 2014

(65) Prior Publication Data

US 2015/0199398 A1  Jul. 16, 2015

Related U.S. Application Data

(63) Continuation of application No. 14/155,554, filed on Jan. 15, 2014.

(51) Int. Cl.
*G06F 17/30* (2006.01)

(52) U.S. Cl.
CPC .... *G06F 17/30371* (2013.01); *G06F 17/3089* (2013.01); *G06F 17/30882* (2013.01)

(58) Field of Classification Search
CPC ......... G06F 17/30575; G06F 17/30371; G06F 17/30882
USPC .................................. 707/687, 690
See application file for complete search history.

(56) References Cited

U.S. PATENT DOCUMENTS

| 7,240,054 | B2 | 7/2007 | Adiba et al. |
| 7,325,193 | B2* | 1/2008 | Edd ..................... G06F 17/3089 707/999.102 |
| 8,027,960 | B2 | 9/2011 | Herbeck et al. |
| 8,086,952 | B2* | 12/2011 | Edd ..................... G06F 17/3089 715/229 |
| 8,200,775 | B2 | 6/2012 | Moore |

(Continued)

OTHER PUBLICATIONS

Anonymous, "Method to detect and Alert Users of Invalid RSS Feeds and Subsequently Correct the Invalid RSS Feeds", IP.com Prior Art Database Technical Disclosure, IP.com Number: IPCOM000205521D, Publication: Mar. 29, 2011, website: http://ip.com/IPCOM/000205521.

(Continued)

*Primary Examiner* — Debbie Le
(74) *Attorney, Agent, or Firm* — David B. Woycechowsky

(57) ABSTRACT

Embodiments of the present invention relate to managing content item syndication by maintaining referential integrity between isolated systems. A computing device receives a first content item, wherein the first content item has an external dependency with a second content item defined by a first reference. In response to determining that the second content item does not exist on the computing device, the computing device generates a second reference to replace the first reference, wherein the second reference defines a dependency of the first content item to a third content item. The computing device generates a link that directs a user to the third content item in response to the user attempting to access the second content item.

5 Claims, 5 Drawing Sheets

(56) References Cited

U.S. PATENT DOCUMENTS

| | | | |
|---|---|---|---|
| 8,762,850 B2* | 6/2014 | Matz | G06F 17/30867 715/723 |
| 2003/0120593 A1 | 6/2003 | Bansal et al. | |
| 2006/0242072 A1 | 10/2006 | Peled et al. | |
| 2007/0038567 A1* | 2/2007 | Allaire | G06Q 30/0239 705/50 |
| 2007/0088754 A1 | 4/2007 | Brannon et al. | |
| 2009/0150978 A1* | 6/2009 | Wu | H04L 9/083 726/4 |
| 2012/0170074 A1* | 7/2012 | Ackerman | G06F 3/1206 358/1.15 |
| 2012/0278343 A1* | 11/2012 | Steele | G06Q 30/02 707/754 |
| 2012/0284290 A1 | 11/2012 | Keebler et al. | |
| 2013/0080900 A1* | 3/2013 | Wilde | G06F 17/30893 715/736 |
| 2014/0040315 A1* | 2/2014 | Hampton | G06F 17/30722 707/783 |
| 2014/0180984 A1* | 6/2014 | Arthur | G06N 3/02 706/15 |
| 2014/0280165 A1* | 9/2014 | Jain | G06F 17/30755 707/738 |
| 2014/0280303 A1* | 9/2014 | Jain | G06F 17/30017 707/769 |
| 2014/0280468 A1* | 9/2014 | Duncan | H04L 67/2814 709/203 |
| 2014/0359085 A1* | 12/2014 | Chen | H04L 41/0803 709/220 |
| 2015/0186345 A1* | 7/2015 | Baldwin | G06F 17/2288 715/229 |
| 2015/0186428 A1* | 7/2015 | Baldwin | G06F 17/2288 707/627 |

OTHER PUBLICATIONS

Bauman, "IBM Lotus Web Content Manager: Tracings and common exceptions", adited by John James on Jun. 17, 2009, version 15, website: http://www-10.lotus.com/1dd/portalwiki.nsf/dx/ibm-lotus-web-content . . . .

Garcia et al., "Extended Aggregations for Databases with referential Integrity Issues", Official version published on Elsevier DKE, 69 910 ; 63-95, 2010.

U.S. Appl. No. 14/555,554 entitled "Managing Content Item Syndication by Maintaining Referential Integrity Between Remote or Isolated Systems", filed Jan. 15, 2014.

* cited by examiner

MANAGING CONTENT ITEM SYNDICATION BY MAINTAINING REFERENTIAL INTEGRITY BETWEEN REMOTE OR ISOLATED SYSTEMS

BACKGROUND

The present disclosure relates generally to the field of content management, and more particularly to managing content item syndication by maintaining referential integrity between isolated systems.

Content management systems often separate development, authoring, staging and production environments. With this separation comes the requirement to support transmitting artifacts between these environments (hereinafter "syndicate") that can introduce data management issues, such as unknown or unresolvable references. CMS can control the referential integrity between content items. For example, if content item A references content item B then content item B can not be deleted until the reference within content item A is removed or re-routed to a different content item, which ensures that on the final production site the link that appears with content item A is operational and not generating a, for example, a "404 Not Found" error notice.

At times, race conditions can occur wherein a down stream system attempts to apply a syndicated item that refers to a content item that does not yet exist on the system, which can frustrate the ability to ensure referential integrity of syndicate content items between systems. Current solutions include cataloging the original reference value along with the property within the content item that held it in a collection of references to fix. Another approach involves committing all changes that being syndicated into a repository in a single transaction.

SUMMARY

Embodiments of the present invention relate to managing content item syndication by maintaining referential integrity between isolated systems. A computing device receives a first content item, wherein the first content item has an external dependency with a second content item defined by a first reference. In response to determining that the second content item does not exist on the computing device, the computing device generates a second reference to replace the first reference, wherein the second reference defines a dependency of the first content item to a third content item. The computing device generates a link that directs a user to the third content item in response to the user attempting to access the second content item.

DETAILED DESCRIPTION

Figure 1:
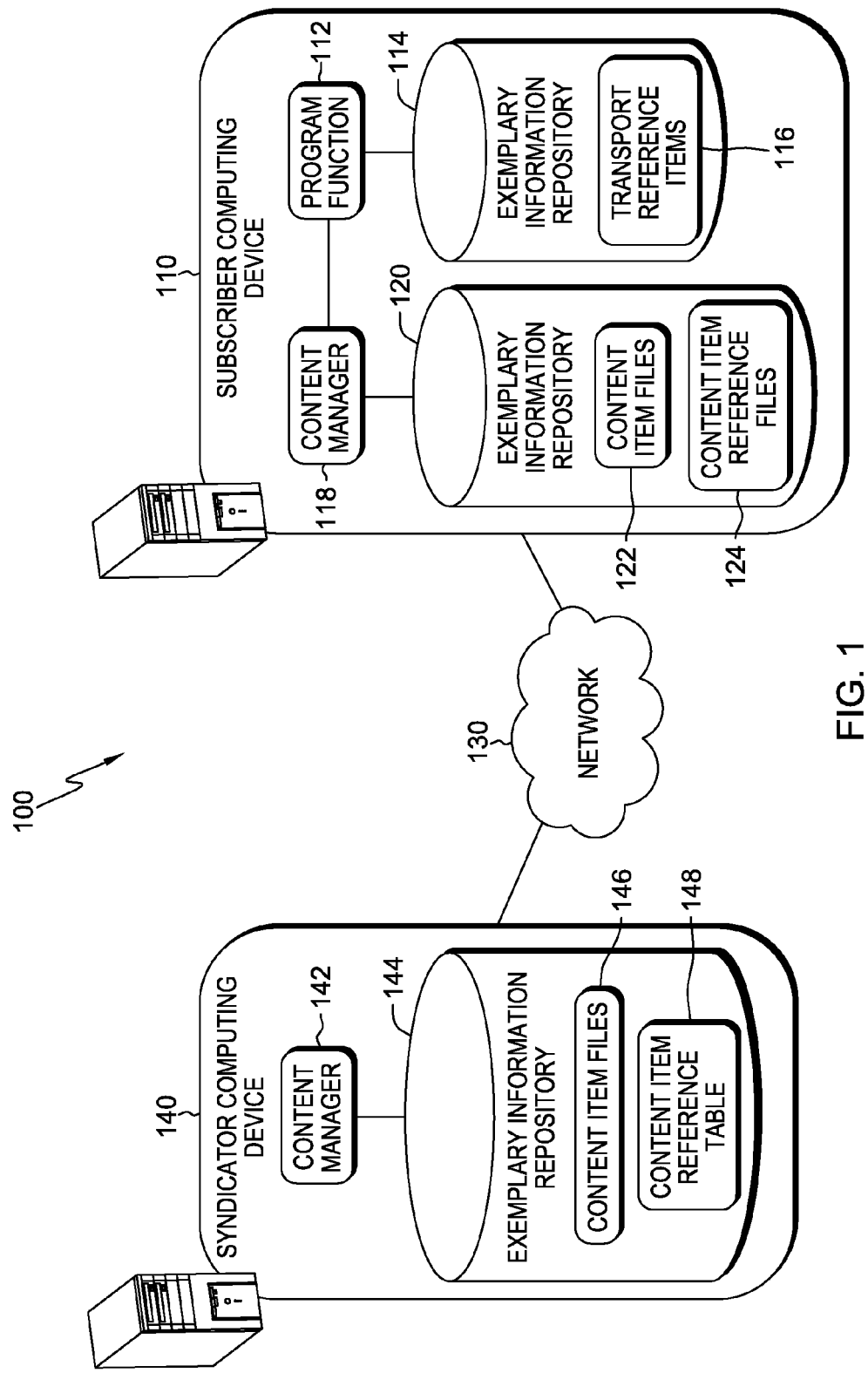
FIG. 1 is a block diagram illustrating an environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (hereinafter "RAM"), a read-only memory (hereinafter "ROM"), an erasable programmable read-only memory (hereinafter "EPROM" or "Flash memory"), an optical fiber, a portable compact disc read-only memory (hereinafter "CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (hereinafter "LAN") or a wide area network (hereinafter "WAN"), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Content management systems often separate authoring, staging, delivery and production of content items in to one or more different environments. Content items are created and managed in the authoring environment, aggregated in the staging environment, rendered and delivered in the delivery environment, and implemented and delivered in the production environment. Replicating data from a content library on one computing device to a content library on another computing device is referred to as "syndication". With this separation comes the requirement to support transmitting artifacts between these environments that can introduce data management issues, such as unknown or unresolvable references.

Syndication requires a syndicator and a subscriber. Syndicators transmit data to subscribers, which subscribe. In certain embodiments, a computing device can be both a syndicator and a subscriber. Embodiments of the present invention seek to support the syndication of content items with referential integrity by creating temporary references when unresolved dependencies are encountered to aid in addressing errors encountered during the syndication of content item having dependencies that might leave the content item in an invalid state. Embodiments of the present invention will now be described in detail with reference to the Figs. FIG. 1 is a block diagram illustrating an environment, generally designated 100, in accordance with an embodiment of the present invention.

Environment 100 includes syndicator computing device 140 and subscriber computing device 110, all interconnected over network 130. Network 130 can be, for example, a local area network (LAN), a wide area network (WAN) such as the Internet, or a combination of the two, and can include wired, wireless, or fiber optic connections. In general, network 130 can be any combination of connections and protocols that will support communications between syndicator computing device 140 and subscriber computing device 110.

In various embodiments of the present invention, syndicator computing device 140 and subscriber computing device 110 may be a laptop computer, tablet computer, netbook computer, personal computer (hereinafter "PC"), a desktop computer, a personal digital assistant (hereinafter "PDA"), a smart phone, or any programmable electronic device capable of communicating via network 130. Syndicator computing device 140 is a computing device that can replicate content items to a subscriber, in accordance with an embodiment of the present invention. Syndicator computing device 140 includes content manager 142 and exemplary repository 144. Exemplary repository 144 is an information store that includes content item files 146, which further include content items, which are files that include data, text, media, and/or webpage templates). Although depicted as an internal component of syndicator computing device 140, exemplary information repository 144 may be external to syndicator computing device 140. In certain embodiments, content items included in content item files 146 can have external dependencies on other content items that may or may not exist in content item files 146. Content item reference table 148 includes referential information reflective of the external dependencies of content items included in content item files 146.

Content manager 142 is software that can support one or more content management environments, such as development, authoring, staging, and production, in accordance with an embodiment of the present invention. In an embodiment, content managers 1420 and 188 are copies of the same software. Content manager 142 is in communication with exemplary information repository 144. Content manager 142 can syndicate content items to other content managers, such as content manager 118. Syndication is the method by which content items are replicated from one web content repository, such as exemplary information repository 120, to another, such as exemplary information repository 120. In an embodiment, content manager 142 can receive information from content manager 118. The syndicated change set transmitted by content manager 142 can include transporting artifacts reflective of content item dependencies. However, at times, dependencies reflected in the transporting artifact can include content items that are not present on the subscribing system, which may result in errors, such as broken links, out of date postings and lower user satisfaction.

Subscriber computing device 110 includes exemplary repositories 120 and 114, content manager 118, and program function 112, in accordance with an embodiment of the present invention. Exemplary information repository 120 includes content item reference files 124 and content item files 122. Content item reference files 124 include information that reflects the dependencies of content items included in content item files 122. Content manager 188 is in communication with exemplary information repository 120 and program function 122, in accordance with an embodiment of the present invention.

Content manager 118 is software that supports the collection, managing, and publishing of information, such as content items. Content manager 118 can support a content management environment for the development, authoring, staging, and/or production of content items, such as, content items included in content item files 146. In an embodiment, content manager 118 subscribes information from other content managers, such as content manager 140. Program function 112 is in communication with content manager 118 and exemplary information repository 114, in accordance with an embodiment of the present invention. Program function 112 is software that reduces errors associated with unknown or unresolvable references with content items deployed in a syndicated change set (discussed above), in accordance with an embodiment of the present invention.

Figure 2:
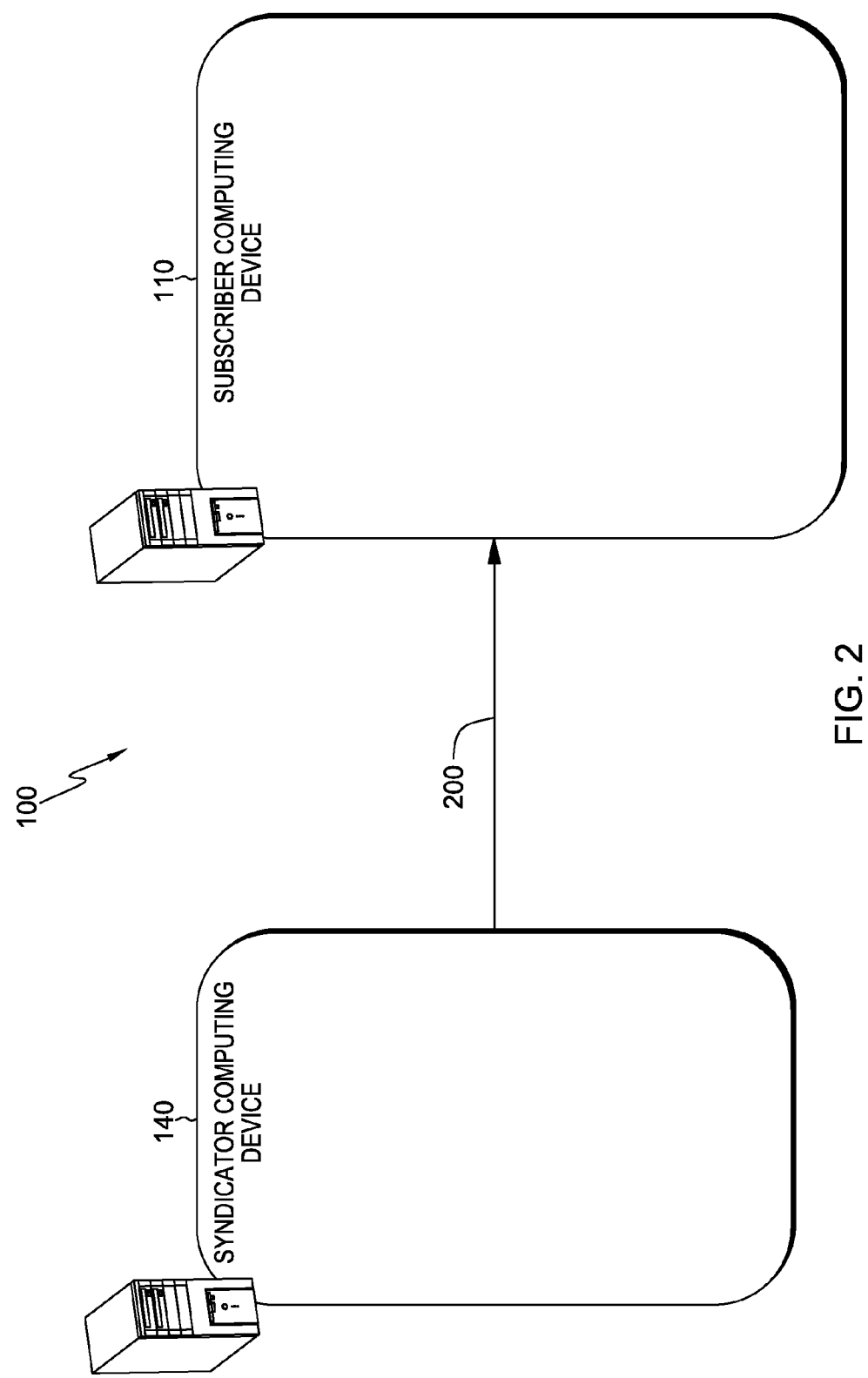
FIG. 2 illustrated an exemplary syndication event, in accordance with an embodiment of the present invention.

Program function 112 generates transport reference items 116. Unknown references within syndicated change sets are stored as unique references (hereinafter "transport reference items") within exemplary information repository 144. A change sets is a set of changes that should be treated as an indivisible group. Concepts discussed in reference to FIGS. 2, 3, and 4 support concepts that will be discussed in reference to FIG. 5. FIG. 2 depicts a syndication event, in accordance with an embodiment of the present invention. Specifically, FIG. 2 illustrates a syndication event that involves syndicator computing device 120 and subscriber computing device 10, wherein a change set (discussed further in reference to FIGS. 3 and 4) is syndicated from syndicator computing device 120 to subscriber computing device 110, via network 130.

Figure 3:
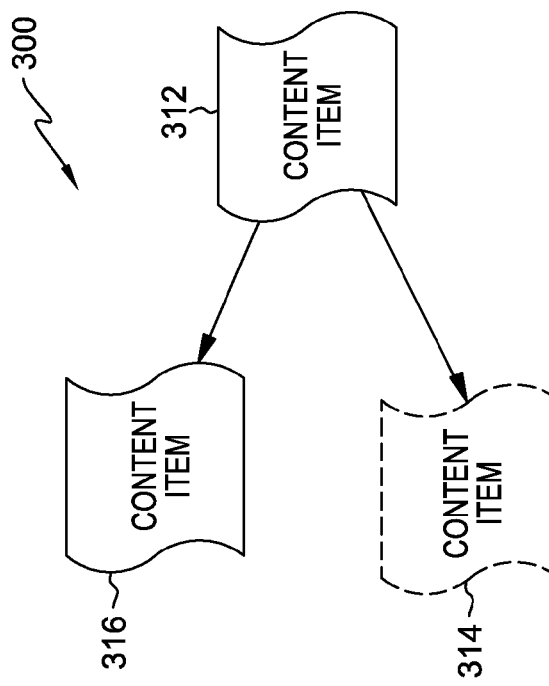
FIG. 3 illustrates an exemplary depiction of the change set of the exemplary syndication event, in accordance with an embodiment of the present invention.

FIG. 3 depicts an exemplary illustration of the change set of syndication event 210, in accordance with an embodiment of the present invention. Syndication event 210 involves the syndication of data from syndicator computing device 140 to subscriber computing device 110. Syndication event 210 initiates when content manager 142 receives notification to syndicate a change set, for example, change set 300, and concludes when content manager 118 receives the syndicated change set. Continuing, upon receipt, program function 112 determines that content item 312 has external dependencies associated with content items 316 and 314. The reference associated with the dependencies between contents 314 and 312 is unresolved (as depicted by the broken line boarder of content item 314) because program function 112 determined that content item 314 is not stored in content item files 122 or subscriber computing device 110. Content item references may be unresolvable due to, for example, a corrupt or missing file.

Figure 4:
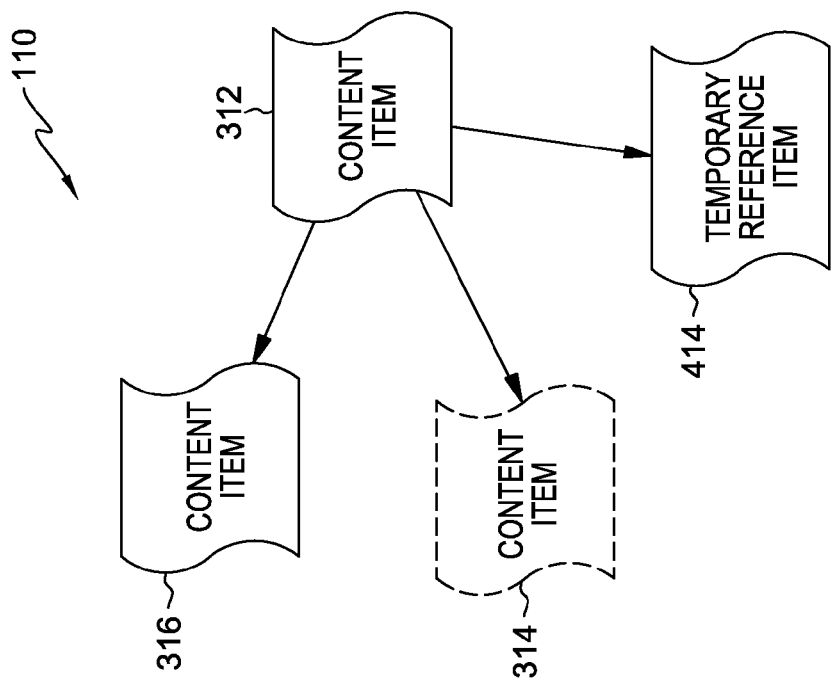
FIG. 4 illustrates an exemplary depiction of a modified syndicated content item, in accordance with an embodiment of the present invention.

For each unresolved reference, such as the unresolved reference associated with content item 314, included in change set 300 that is marked for syndication, program function 112 generates a transport reference item, for example, in transport reference items 116, for example, TRI314. FIG. 4 illustrates an exemplary depiction of a modified syndicated content item, in accordance with an embodiment of the present invention. In certain embodiments, program function 112 instructs content manager 118 to update content item reference files 124 to reflect that the dependency of content item 312 on content item 314 is replaced with that of a temporary reference item, such as TRI414. In certain embodiments, transport reference items 116 can point to alternative content items of the same content item type as the unresolved content item, for example, text, template, and media. In certain embodiments, as a user encounters a website with an unresolved content item, the use of temporary reference item to temporarily stand in for unresolved content items allows the website to remain operational while content therein is being updated.

Figure 5:
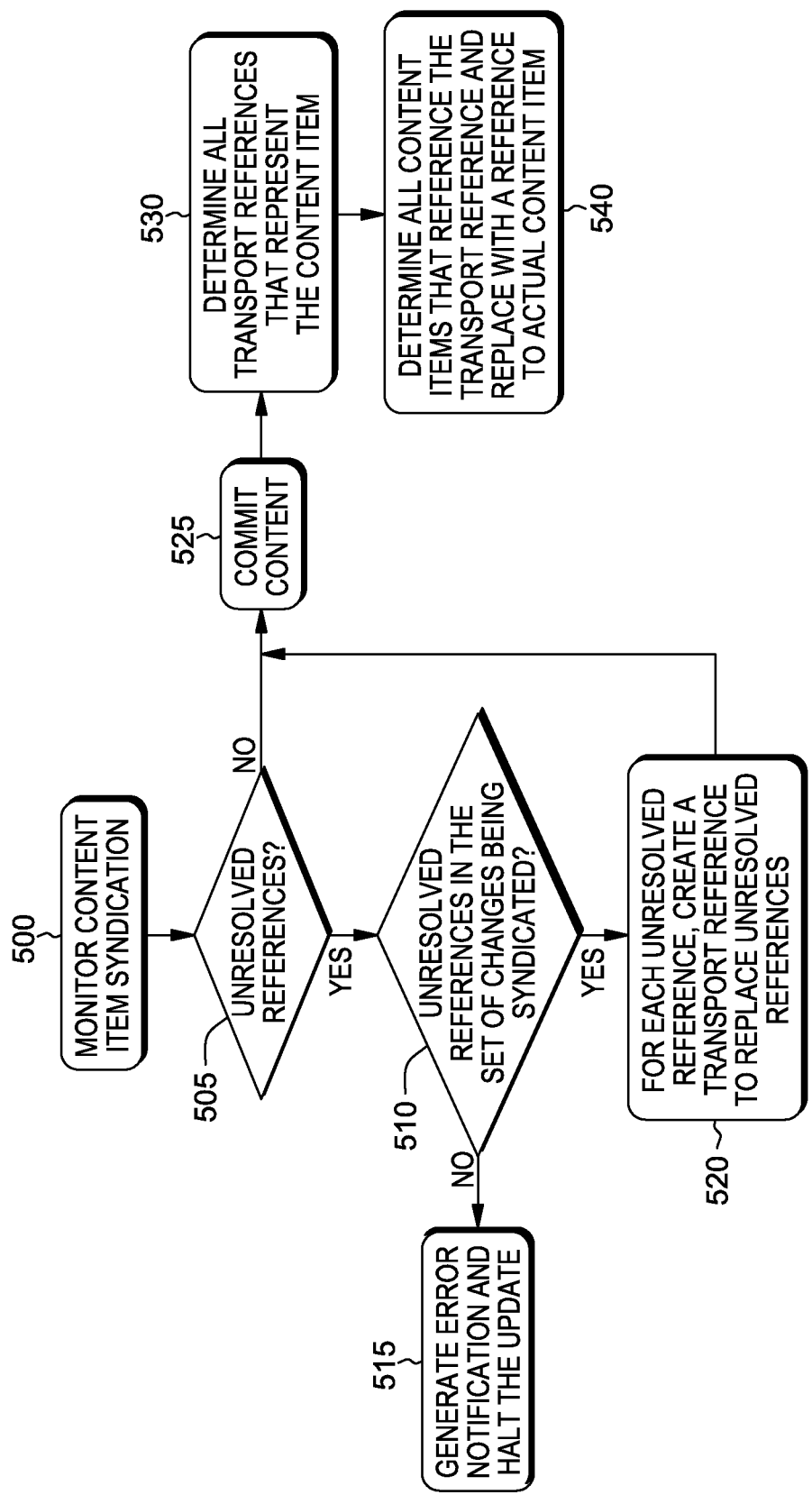
FIG. 5 depicts operational steps of a program function, in accordance with an embodiment of the present invention.

Subsequently, program function 112 instructs content manager 118 to commit change set 300 to content item files 122. In response to determining that the reference to content item 314 has been resolved, program manager 112 instructs content manager 118 to update content reference files 124 to point to the newly resolved content item. FIG. 5 depicts the operational steps of program function 112, in accordance with an embodiment of the present invention. Program function 112 monitors content management syndication (step 500). If program function 112 determines that there are no unresolved issues ("no" branch decisional 505), then program function 112 instructs content manager 118 to commit the content items to the content item library (step 525).

If program function 112 determines that there are unresolved references included in the syndicated change set ("yes" branch decisional 505), program function 112 proceeds to decisional 510. If program function 112 determines that the unresolved content item is not included in the syndicated change set (decisional 510), program function 112 generates an error notification and instructs content manager 118 to halt the update (step 515). If program function 112 determines that the unresolved content item is included in the syndicated change set (decisional 510), then for each unresolved reference, program function 112 generates a transport reference item to replace the unresolved reference (step 520) and proceeds to step 525.

Program function 112 determines the transport references that represent the content item (step 530). Program function 112 determines all content items that reference the transport reference item and instructs content manager 118 to replace the reference with determined content items (step 540).

Figure 6:
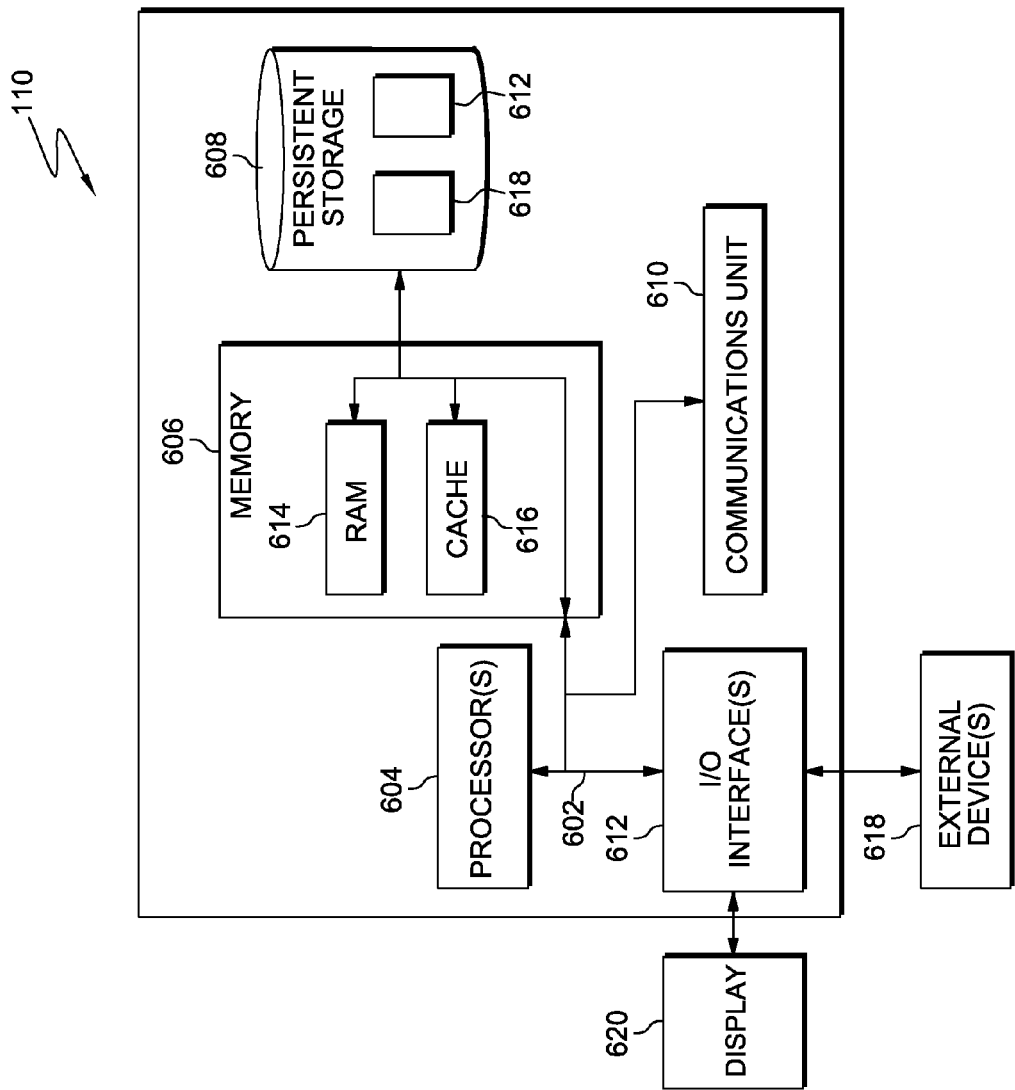
FIG. 6 depicts a block diagram of components of the computing device, in accordance with an embodiment of the present invention.

FIG. 6 depicts a block diagram of components of subscriber computing device 112 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

subscriber computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (hereinafter "RAM") 614 and cache memory 616. In general, memory 606 can include any suitable volatile or non-volatile computer-readable storage media.

Program function 112, content manager 118, and exemplary information repositories 120 and 114 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (hereinafter "ROM"), erasable programmable read-only memory (hereinafter "EPROM"), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including syndicator computing device 120. In these examples, communications unit 410 includes one or more network interface cards. Communications unit 610 may provide communications through the use of either or both physical and wireless communications links. Program function 112 and content manager 118 may be downloaded to persistent storage 608 through communications unit 610.

I/O interface(s) 612 allows for input and output of data with other devices that may be connected to subscriber computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., program function 112 and content manager 118, can be stored on such portable computer-readable storage media and can be loaded onto persistent storage 608 via I/O interface(s) 612. I/O interface(s) also connects to a display 620. Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   determining that a content item includes an instance of an unresolved reference to another content item yet to be created;
   replacing the instance of the unresolved reference in the content item with an instance of a transport reference;
   committing the content item into a repository; and
   responsive to a creation of the another content item, replacing the instance of the transport reference in the content item with an instance of a resolved reference to the another content item.

2. The method of claim 1, wherein the repository subscribes to data from a content library.

3. The method of claim 1, wherein the repository supports one or more of the following content management environments:
   development;
   authoring;
   staging; and
   production.

4. The method of claim 1, wherein the first content item is included in a change set received by the repository.

5. The method of claim 1, wherein the first content item includes one or more of:
   data;
   text;
   media; and
   webpage template.

* * * * *